UNITED STATES PATENT OFFICE.

ABBOT R. DAVIS, OF BOSTON, MASSACHUSETTS.

METHOD OF MAKING ARTICLES FROM WASTE AMBER.

SPECIFICATION forming part of Letters Patent No. 237,497, dated February 8, 1881.

Application filed January 8, 1881. (No specimens.)

*To all whom it may concern:*

Be it known that I, ABBOT R. DAVIS, of Boston, in the county of Suffolk and State of Massachusetts, have invented a new and Improved Process of Uniting and Molding Amber; and I do hereby declare the following to be a full, clear, and exact description of the same.

In the manufacture of amber into the various ornamental and useful articles for which it is especially used, such as mouth-pieces for pipes, sleeve-buttons, brooches, &c., it has been the custom to carve such articles out of a single piece of amber, a skilled workman cutting and chipping it away until it approximates the desired form, when it is filed and polished up into a finished shape. Such manufacture necessarily involved a great amount of waste, as the chippings of amber too small to be used in fashioning articles of ornament were of little or no value.

In Letters Patent granted to me November 23, 1880, I have described and claimed a process of uniting and molding amber by heat and pressure combined, whereby all waste material can be worked up into articles of great commercial value.

It has been found by experience that the high degree of heat required to soften the amber when it is placed in the mold in its natural hard condition likewise destroys much of its original delicacy of color, giving it a deeper and darker hue; and to prevent this change, which is mainly due to the application of intense heat, is the object of my present invention.

To accomplish this end, I first reduce the pieces of amber to a plastic condition by subjecting them to the action of certain solvents, and then mold them into a homogeneous mass either by pressure alone or by heat and pressure combined, all as will be more fully hereinafter set forth.

To reduce waste amber to a plastic condition, so that it may be readily united and molded into a homogeneous mass without destroying any of its essential qualities or changing its peculiar characteristic delicacy of coloring, is the main purpose of my present improvement.

In carrying out my invention I first select from the waste fragments of amber a quantity of pieces of about uniform size and treat them with chemicals, by placing them in a close-mouthed jar containing ether or a solution of bisulphide of carbon. These solvents I have found in practice to answer the purpose; but others possessing similar properties may be used without departing from the spirit of my invention. After the pieces have been immersed in the solution for about five hours they will be reduced to a condition of softness sufficient to yield under strong pressure. The time required to bring the amber to a semi-elastic state may be more or less, according to different qualities of the gum, which varies in hardness. After being thus treated the amber is taken out of the solution and spread on a shelf or table, and exposed to the air until a portion of the solvent has passed off by evaporation. It is then placed in a suitable mold and subjected to a heavy pressure. In some cases a slow moderate heat is applied to the mold to facilitate the uniting of the pieces into a homogeneous mass, or the mold may be heated before the amber is placed in it, the object being in all cases to use as little heat as possible in the process of uniting and molding the amber into shape. After it is removed from the mold it is polished up in the usual way.

In the manufacture of mouth-pieces for pipes or cigars my present process in especially applicable, as in these articles it is essential that the amber should be welded together in a compact mass, incapable of expansion or contraction under exposure to atmospheric changes, and capable of being bored without danger of fracture, both of which results are liable to occur where the amber is molded under a high heat.

In order to produce a mouth-piece or other article which shall present a mottled or blotched appearance when finished, I employ the following process: I first grind or pulverize a proportion of hard amber, and then combine it in the mold with a greater or less quantity of pieces previously rendered soft, as before set forth, by the use of solvents. The proportion of pieces may vary considerably, being greater or less, according as it is desired to give a more or less mottled appearance to the finished article. The article may also be made to present a great and intimately-blended variety of coloring, by selecting fragments of amber of different and contrasting hues and molding them together. Thus a peculiar and pleasing appearance is given which cannot be produced where the article is cut from a single block of amber.

In manufacturing mouth-pieces for pipes, &c., according to my present improved process, I employ a mold preferably composed of two portions, namely, a main or outer casing, which serves as a receptacle for an inner casing, which contains the dies and in which the dies are made to slide freely. The dies are designed for the reception of the amber. The construction of the mold, however, may be varied whenever desired, as it forms no part of my present improvement.

Articles produced by my process have been found to possess all the merits of those cut from a single solid piece of amber. No chemical change is produced, so that the amber retains all its essential elements. A large amount of time and labor is saved where the articles are molded instead of being chiseled into shape, as has formerly been done, and in the utilization of the hitherto waste fragments or chippings great economy is effected in the manufacture of amber articles.

What I claim as new, and desire to secure by Letters Patent, is—

1. The process of treating amber by chemical action preparatory to molding, substantially as and for the purpose herein set forth.

2. The herein-described process of uniting amber, which consists in treating it with solvents followed by pressure.

3. The process herein described of uniting and welding together fragments of amber, which consists in first reducing the amber to a plastic condition by the agency of suitable solvents, and then subjecting it to pressure under heat, substantially in the manner herein set forth.

4. The process of producing mottled or blotched amber articles, which consists in molding together ground amber with large fragments, substantially as herein set forth.

5. The process of manufacturing amber mouth-pieces for pipes, &c., which consists in first reducing the fragments of amber to a plastic condition, and molding the same together with ground amber under heat and pressure combined, substantially as herein set forth.

6. As a new manufacture, an amber mouth-piece for pipes, made from fragments of amber molded together substantially in the manner herein set forth.

7. As a new article of manufacture, a mouth-piece for pipes, made of fragments of amber and pulverized amber, molded together by heat and pressure, in the manner and for the purpose set forth.

8. As a new manufacture, articles made of fragments of amber of different hues molded together, substantially in the manner and for the purpose herein set forth.

ABBOT R. DAVIS.

Witnesses:
 GEO. MINNICK,
 G. F. KALDENBERG.